(12) United States Patent
Jones

(10) Patent No.: US 7,399,032 B2
(45) Date of Patent: Jul. 15, 2008

(54) MULTI PURPOSE SEAT BACK PROTECTING PANEL

(75) Inventor: Micah R. Jones, Ferndale, MI (US)

(73) Assignee: Intier Automotive Inc., Newmarket, Ontario (CA)

( * ) Notice: Subject to any disclaimer, the term of this patent is extended or adjusted under 35 U.S.C. 154(b) by 66 days.

(21) Appl. No.: 10/577,969

(22) PCT Filed: Nov. 24, 2004

(86) PCT No.: PCT/CA2004/002019

§ 371 (c)(1),
(2), (4) Date: May 2, 2006

(87) PCT Pub. No.: WO2005/049370

PCT Pub. Date: Jun. 2, 2005

(65) Prior Publication Data

US 2007/0069555 A1    Mar. 29, 2007

(51) Int. Cl.
*A47C 7/62* (2006.01)
(52) U.S. Cl. ............................. 297/188.04; 297/188.08
(58) Field of Classification Search ............ 297/188.01, 297/188.02, 188.03, 188.04, 188.05, 188.06, 297/188.07, 253, 226, 228.13
See application file for complete search history.

(56) References Cited

U.S. PATENT DOCUMENTS

| | | | | |
|---|---|---|---|---|
| 5,713,633 A | * | 2/1998 | Lu | 297/364 |
| 5,863,092 A | * | 1/1999 | Kifer | 297/188.04 |
| 6,059,358 A | * | 5/2000 | Demick et al. | 297/188.04 |
| 6,142,561 A | * | 11/2000 | Pesta et al. | 297/188.04 |
| 6,199,948 B1 | * | 3/2001 | Bush et al. | 297/217.3 |
| 6,702,375 B1 | * | 3/2004 | Laskowski et al. | 297/188.07 |
| 6,860,550 B2 | * | 3/2005 | Wojcik | 297/163 |
| 2002/0060481 A1 | * | 5/2002 | Jones | 297/188.04 |

FOREIGN PATENT DOCUMENTS

| | | |
|---|---|---|
| GB | 454349 | 9/1936 |
| GB | 2 291 584 A | 1/1996 |
| JP | 11-005493 A | 1/1999 |
| JP | 2003-275058 A | 9/2003 |

OTHER PUBLICATIONS

English Abstract of JP-2003-275058 A.
English Abstract of JP-11-005493 A.

* cited by examiner

*Primary Examiner*—Sarah B McPartlin
(74) *Attorney, Agent, or Firm*—Clark Hill PLC

(57) ABSTRACT

A seat back panel for a fold flat seat assembly comprises a panel attached to a seat back for elevating stored objects within a vehicle above a seat back when the seat back is in a folded flat position. An opening within the panel receives objects and retains them between the seat back and the seat panel. The panel includes hooks for holding hanging items within the vehicle. The hooks are only operable when the seat back is in the folded flat position for preventing interference with an airbag disabling system utilizing weight sensors.

6 Claims, 2 Drawing Sheets

MULTI PURPOSE SEAT BACK PROTECTING PANEL

RELATED APPLICATIONS

This application is a national filing under 35 USC 371 from international application PCT/CA2004/002019, filed Nov. 24, 2004 and claims all the benefits and priority of provisional application 60/524,709, filed Nov. 24, 2003.

FIELD OF THE INVENTION

The present invention relates to vehicle seating assemblies, and more particularly, to a seat back panel for a fold flat seat assembly.

DESCRIPTION OF RELATED ART

Seat assemblies for automotive vehicles typically include a seat cushion with a seat back pivotally coupled thereto. In a fold flat seat assembly, the seat back pivots from a generally upright seating position to a forwardly folded flat position adjacent the seat cushion. The seat back includes a front face for contacting the seat cushion when the seat assembly is in the folded flat position, and a rear face providing a substantially flat load surface for supporting items carried within the vehicle when the seat assembly is in the folded flat position.

Items resting on the load surface can damage the rear of the seat back if is not protected. Typically, a large panel covers at least a substantial portion of the rear face of the seat back to prevent such damage. The panel is often bulky and expensive. Additionally, if the fold flat seat assembly is a front passenger seat assembly, the panel on the rear face of the passenger seat back is often visually unappealing, especially since the driver's seat does not usually contain a similar panel. Therefore, it is desirable to provide a seat back protecting panel with reduced bulk, thereby reducing cost and the amount of material, while also increasing visual compatibility between the passenger seat and the driver's seat when the panel is used on the rear face of a front passenger seat.

It is also known in the art to provide storage on the rear of a seat back for various small items, such as a compartment for storing an umbrella or a hook for holding items such as a purse or a handled plastic grocery bag. However, the weight from the items may interfere with a vehicle's airbag disabling system. A typical modern vehicle includes front airbags to protect front seat passengers in the event of a collision. Typically, a first airbag is mounted within the steering wheel to protect a driver, and a second airbag is mounted within the instrument panel in front of a passenger seat to protect a passenger. Many vehicles include disabling systems to disable the passenger airbag it a weight sensor detects a weight below a predetermined threshold, thus indicating the absence of a passenger in the seat. If the weight of the items stored in seat back storage areas exceeds this predetermined threshold, the airbag disabling system will conclude that there is a passenger, and thus not disable the airbag. In a fold flat seat assembly, the disabling system can be configured to disable the passenger airbag if the seat is in the folded flat position, which would also tend to indicate the absence of a passenger in the seat. Therefore, it is also desirable to provide seat back storage areas which store heavy items, such as a purse or grocery bags, only when the seat is in the folded flat position, thereby preventing interference with the airbag disabling system.

SUMMARY OF THE INVENTION

According to one aspect of the invention, there is provided a seat assembly for use in an automotive vehicle comprising a generally horizontal seat cushion and a seat back pivotally coupled to the seat cushion for movement between an upright seating position and a folded flat position overlying the seat cushion. The seat back includes a front face facing the seat cushion and an opposite rear face. A seat back panel is fixedly secured to the rear face of the seat back and has a support surface for supporting a load above the seat back in the folded flat position. At least one hook is secured to the seat back panel and arrange to project downwardly from the seat back in the upright position to prevent usage and project upwardly from the seat back in the folded flat position for use in supporting articles on the seat back panel.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE INVENTION

Figure 1A:
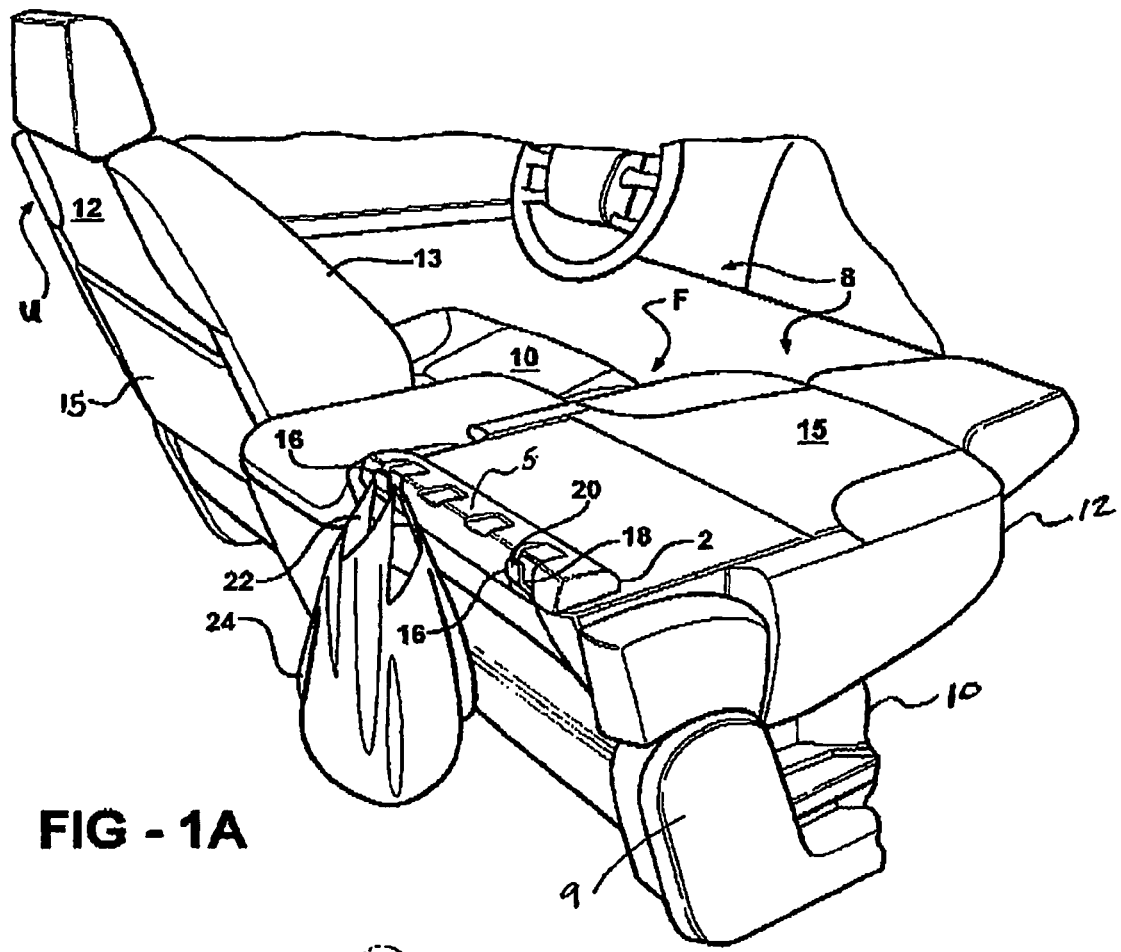
FIG. 1A is a perspective view of a seat assembly incorporating a first embodiment of a seat back panel of the present invention including an elevating panel and utility hooks.
Figure 1B:
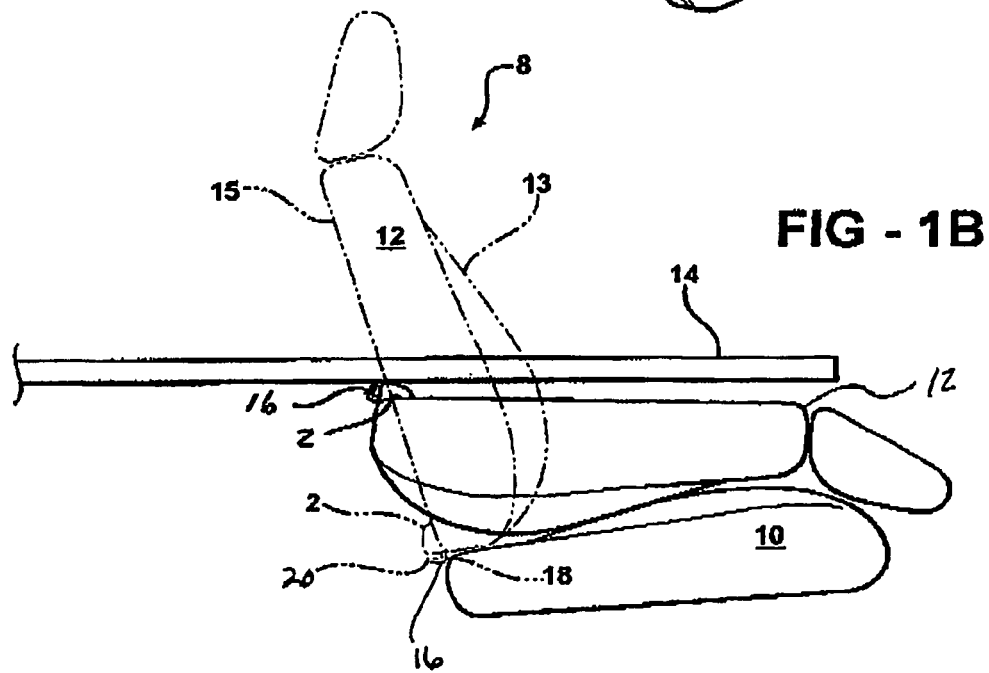
FIG. 1B is a side view of the seat assembly in FIG. 1A.

Referring to the figures, FIGS. 1A and 1B illustrate a fold flat seat assembly 8 for use with the present invention. The seat assembly 8 comprises a generally horizontal seat cushion 10, adapted to be fixedly secured to the floor of an automotive vehicle, and a seat back 12. The seat cushion 10 and seat back 12 are typically formed of a rigid support frame supporting a resilient foam pad encased in a soft trim cover. The seat back 12 is pivotally coupled to the seat cushion 10 by a recliner mechanism 9 for pivotal movement between a generally upright seating position, shown at U, and a forwardly folded flat position, shown at F, overlying the seat cushion 10. The seat back 12 includes a front face 13 for supporting an occupant when seated in the seat assembly 8 and contacting the seat cushion 10 when the seat assembly 8 is in the folded flat position F, and a rear face 15 providing a substantially flat load surface for supporting items carried within the vehicle when the seat assembly 8 is in the folded flat position F. A seat back panel 2 of a first embodiment of the present invention comprises a relatively narrow strip of molded plastic, preferably attached at the bottom edge of the rear face 15 of the seat back 12 as shown in the figures. However, the panel 2 may attach at any height on the rear face 15 of the seat back 12 and still accomplish the present invention. The panel 2 projects from the seat back 12 to elevate a supported load 14, shown in FIGS. 1B and 2B, above the rear face 15 of the seat back 12. That is, the panel 2 projects outwardly from the rear face 15 of the seat back 12 and provides a support surface 5 for the load 14 when the seat back 14 is in the folded flat position to space the load 14 from the remaining portion of the rear face 15 and protect the seat back 12 and trim cover from damage by the load 14.

The panel 2 preferably includes a pair of utility hooks 16 for storing hanging items, such as a purse, grocery bag 24, of the like, as shown in FIG. 1A. While the preferred embodiment includes two hooks 16, any number of hooks 16 may be formed within the panel 2. Because of the unique design of the hooks 16, they may only be used when the seat assembly 8 is in the folded flat position F, as shown in the Figures. Specifically, each hook 16 preferably includes a slanted portion 18 and a retaining portion 20. By referencing the seat back 12 in the folded flat position of FIG. 1A, the slanted portion 18 projects rearwardly and upwardly from the panel 2. The retaining portion 20 is presented projecting generally vertically from the slanted portion 18 and perpendicular to the seat back 12. A space is formed between the retaining portion 20 and the panel 2. When the seat back 12 is in the folded flat position F, a handle 22 of the bag 24 can rest upon the slanted portion 18, or between the slanted portion 18 and the panel 2 as shown. The retaining portion 20 extends substantially upward to prevent the handle 22 from slipping off the hook 16. However, when the seat back 12 is in the upright seating position U, wherein the seat back 12 is substantially upright such that a passenger's back may rest thereagainst, the slanted portion 18 preferably slants substantially downwardly towards the floor of the vehicle, causing the handle 22 to slide down the slanted portion 18 and rest on the retaining portion 20. With the seat back 12 in the upright seating position U, the retaining portion 20, being substantially parallel to or slightly ramped toward the vehicle floor, is unable to retain the handle 22, causing the bag 24 to slip off of the hook 16. Therefore, the hooks 16 may only be utilized when the seat back 12 is in the folded flat position. If the vehicle is equipped with an airbag system assembled in front of the seat assembly, it is desirable to disable the airbag system when the seat back 12 is in the folded flat position and when the seat assembly 8 is either unoccupied by a passenger or if the passenger is below a predetermined threshold weight, such as a small child. The configuration of the hooks 16 prevents stowage of items on the seat back 12 in the upright seating position which may exceed this predetermined threshold weight and falsely enable the airbag system.

Figure 2A:
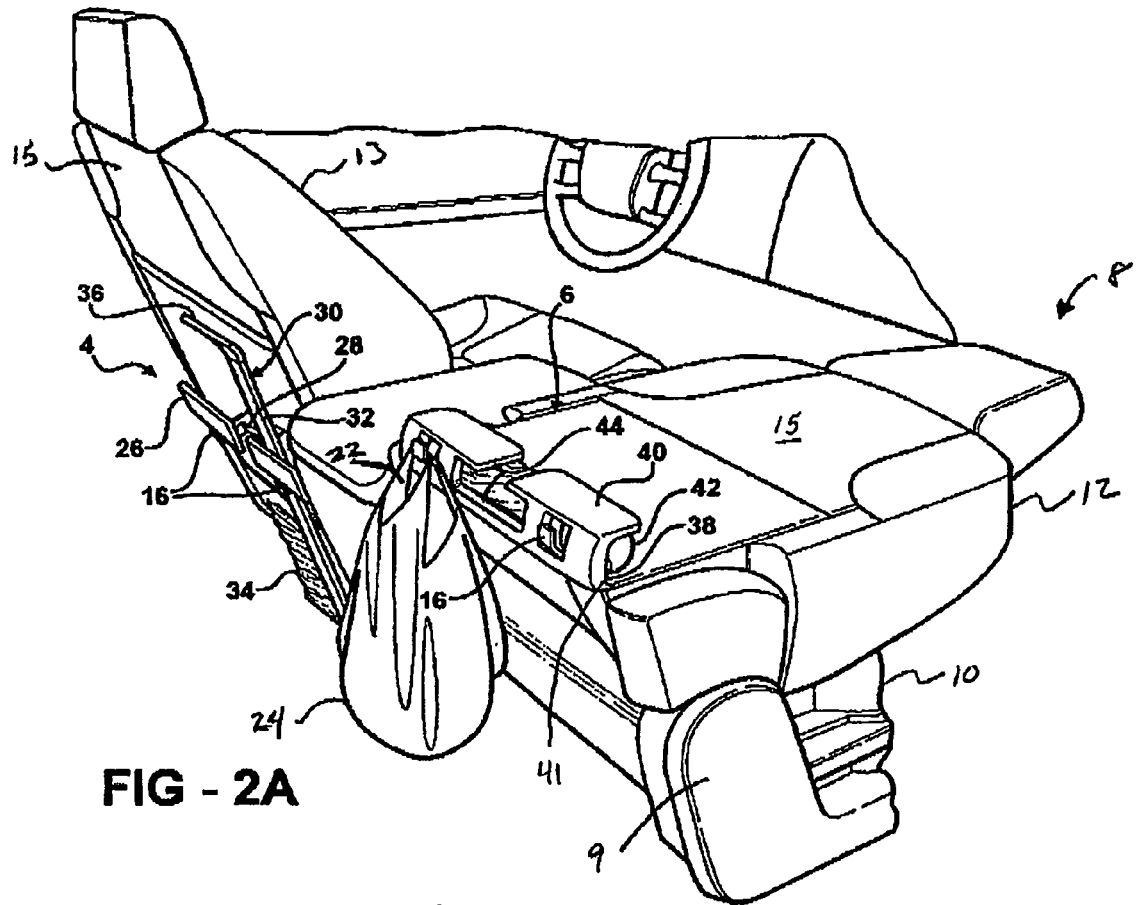
FIG. 2A is a perspective view of a seat assembly incorporating second and third embodiments of the seat back panel of the present invention including additional item storage areas.
Figure 2B:
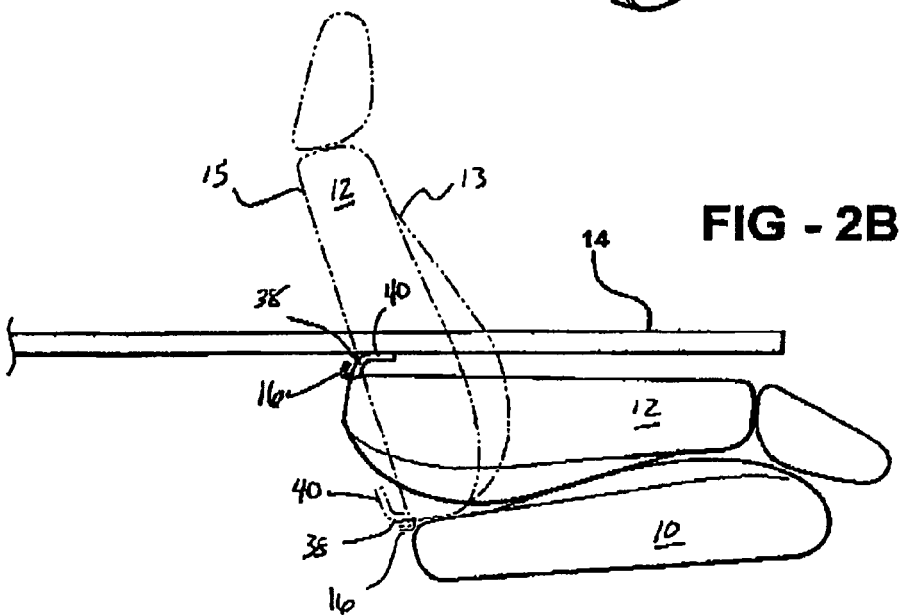
FIG. 2B is a side view of the seat assembly in FIG. 2A.

FIG. 2A illustrates second and third embodiments of the seat back panel 4, 6, respectively, of the present invention. In the second embodiment, the panel 4 comprises a pair of elevating support panels 26. Preferably, clips 28 attach each panel 26 to the rear face 15 of the seat back 12 and support the panels 26 parallel to and spaced from the rear face 15 of the seat back 12. An item may be stowed between the seat back 12 and the panels 26. By way of example, FIG. 2A shows a typical vehicle window ice scraper 30 having a handle 32 extending from a brush end 34 to a squeegee end 36. The scraper 30 may be stowed between the panel 26 and the seat back 12 with the brush end 34 extending beyond the seat back 12 when the seat assembly 8 is in the folded flat position F. Thus, any water or dirt on the brush end 34 drips onto floor mats behind the seat assembly 8 and not onto the seat back 12 itself, thereby preventing damage to the seat back 12 and trim cover. Hooks 16 may be included on the panel 4 for holding hanging items as described above.

In the third embodiment, the panel 6 comprises a connection piece 38 extending perpendicularly from the rear face 15 of the seat back 12 for connecting the panel 6 thereto, and a support surface piece 40 projecting from the connection piece 38 such that it is substantially parallel to and spaced from the rear face 15 of seat back 12 for elevating a supported load 14 above the rear face 15 thereof. A substantially U-shaped cavity 41 is formed by the seat back 12, the connection piece 38 and the support surface piece 40 for securely stowing an object such as an umbrella 42, as shown in FIG. 2A. Hooks 16 may be included on the connection piece 38 for holding hanging items as described above. Additionally, an opening 44 may be formed in the connection piece 38, in the support surface piece 40, or in both, as shown in FIG. 2A, for securing longer items such as an ice scraper, as described above, if there is no item in the cavity blocking the openings 44.

The invention has been described in an illustrative manner, and it is to be understood that the terminology used is intended to be in the nature of words of description rather than of limitation. Many modifications of the present invention are possible in light of the above teachings. It is, therefore, to be understood that within the scope of the appended claims, the invention may be practiced in a substantially equivalent way other than as specifically described.

What is claimed is:

1. A seat assembly for use in an automotive vehicle comprising:
   a generally horizontal seat cushion;
   a seat back pivotally coupled to said seat cushion for movement between an upright seating position and a folded flat position overlying said seat cushion, said seat back including a front face facing said seat cushion and an opposite rear face;
   a seat back panel fixedly secured to said rear face of said seat back and having a support surface for supporting a load above said seat back in said folded flat position; and
   at least one hook fixedly secured to said seat back panel and arranged to project downwardly from said seat back when in said upright position to prevent usage and project upwardly from said seat back when in said folded flat position for use in supporting articles on said seat back panel; said hook including a slanted portion fixedly secured to said seat back panel and projecting outwardly and downwardly from said seat back panel when said seat back is in said upright seating position and a retaining portion fixedly secured to and projecting from said slanted portion and generally perpendicular to said seat back in said folded flat position defining a generally U-shaped channel between said retaining portion and said seat back panel for receiving and securing articles on said hook when said seat back is in said folded flat position.

2. A seat assembly as set forth in claim 1 wherein said seat back panel includes a pair of elevating support panels spaced from said rear face of said seat back and attached thereto by at least one clip.

3. A seat assembly as set forth in claim 1 wherein said seat back panel includes a connection piece fixedly secured to said rear face of said seat back and extending outwardly and generally perpendicular to said seat back, wherein said U-shaped channel is formed between said retaining portion of said hook and said connection piece.

4. A seat assembly as set forth in claim 3 wherein said seat back panel includes a support surface piece extending from said connection piece generally parallel to said seat back to a distal end to support a load spaced from said seat back in said folded flat position and defining a cavity between said support surface piece and said seat back for providing stowage therebetween.

5. A seat assembly as set forth in claim 4 wherein said seat back panel includes a pair of hooks projecting from said connection piece of said seat back panel for use in said folded flat position.

6. A seat assembly as set forth in claim 5 wherein said seat back panel includes at least one opening extending through at least one of said connection piece and said support surface piece for retaining an article along said seat back.

* * * * *